Patented June 24, 1930

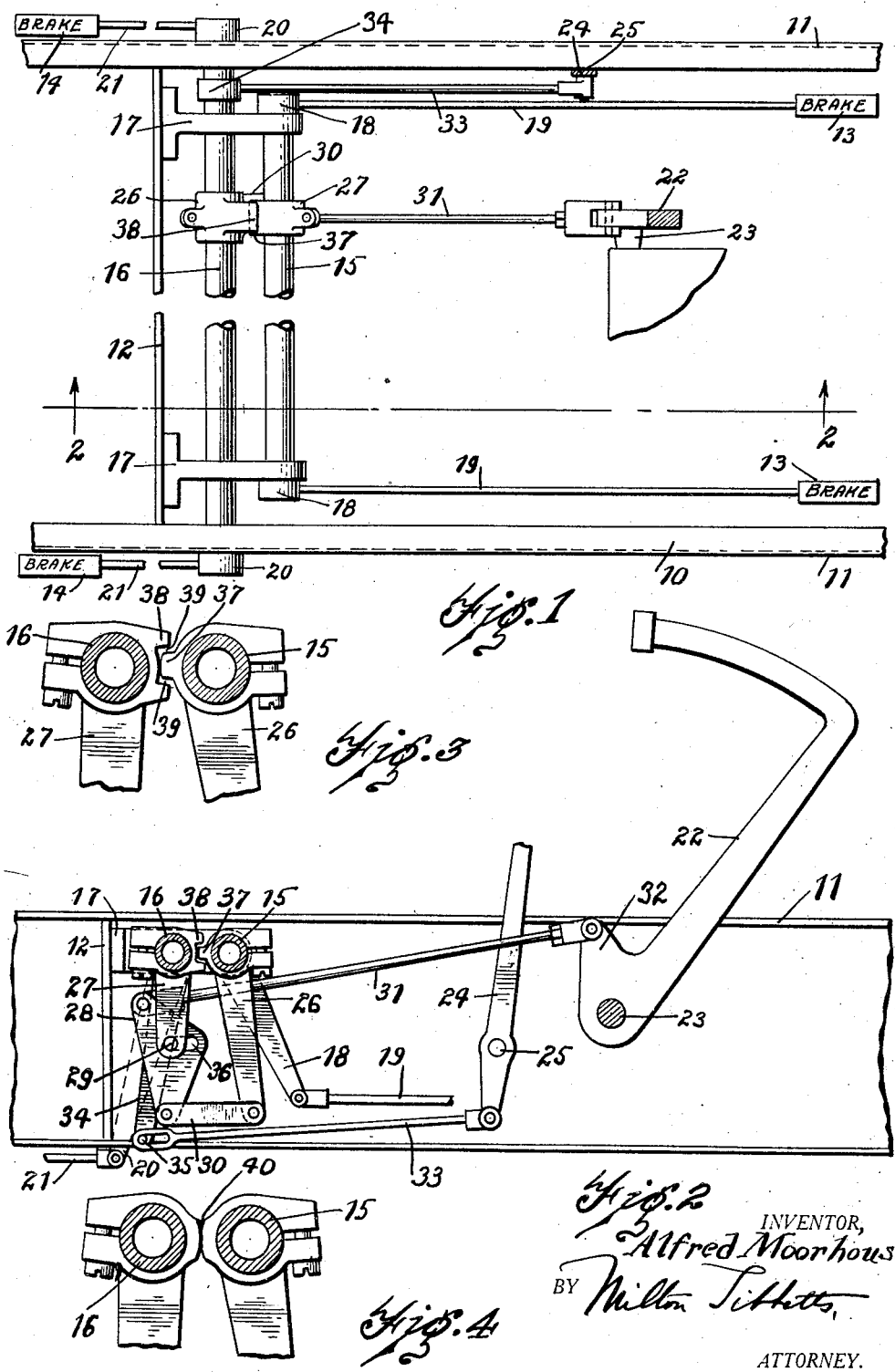

1,766,923

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

BRAKE-OPERATING MECHANISM

Application filed May 21, 1926. Serial No. 110,783.

This invention relates to motor vehicles and particularly to brake operating mechanism therefor. The invention is especially adapted to four wheel brakes and it is shown as applied to a vehicle having a pair of front and a pair of rear brakes.

Most motor vehicles today have two separate means for operating the brakes of the vehicle, usually a hand lever and a foot lever. The foot lever is used as a service brake and the hand lever as the standing brake. It is also desirable that one brake may be used in case of the failure of the other for any reason as by breakage of a connecting part or by carelessness on the part of a workman in connecting the brake parts.

It is usually desirable that more braking effort shall be applied to the rear wheels of a vehicle than to the front wheels though sometimes the reverse is true, and various means for accomplishing one or the other arrangement have been used. This applies more particularly to the foot or service application of the brakes, it being sufficient usually to connect the hand lever to only two of the brakes, more often the rear wheel brakes.

Something more than the ordinary factor of safety is desirable in brake mechanism. Where unusual safeguards can be placed around the operation of a vehicle, the manufacturer is inclined to provide them. Too much duplication of parts is of course not desirable but where duplication of brake connections will serve a useful purpose in an emergency, it is highly desirable to employ them.

It is one of the objects of the present invention to provide in connection with a brake mechanism such as above described, an additional means which will come into operation upon the failure of some of the parts normally connecting a brake lever with the brakes.

A further object of the invention is to provide a normally inoperative connection between the brake operating rock shafts whereby one shaft may be operated by the other shaft upon impairment or failure of the balanced connection between the shafts.

A further object of the invention is to provide means for preventing distortion of the brake operating rock shafts by the balanced connecting mechanism which operates them.

Other objects and advantages will appear from the following description taken in connection with the drawings illustrating a preferred embodiment of my invention and in which:

Fig. 1 is a plan view of the middle portion of a motor vehicle chassis with brake actuating mechanism embodying the invention;

Fig. 2 is an elevation and part section taken substantially on the line 2—2 of Fig. 1.

Fig. 3 is an enlarged view showing more in detail an operating connection between the rock shafts; and Fig. 4 is a view similar to Fig. 3, illustrating another form of the distortion prevention means used independently of the interconnection between the rock shafts.

Referring to the drawings, 10 represents a motor vehicle frame comprising side bars 11 and a cross bar 12. In Fig. 1 the brakes of the vehicle are indicated diagrammatically as they may be of any desired construction. The front brakes are shown at 13 and the rear brakes at 14, and it is intended that these brakes shall be operated either simultaneously as a service brake, or one of the pairs before the other pair as a standing brake.

For operating the front pair of brakes there is a rock shaft 15 and for operating the rear brakes there is a rock shaft 16, these shafts being mounted in suitable brackets 17 connected to the frame. The rock shaft 15 preferably terminates just inside the side bars 11 of the frame and at each end there is an operating arm 18 connected as by a link 19 with the respective brakes 13, so that the rocking of the shaft will actuate those brakes. The rock shaft 16 preferably extends through the frame side bars and at each end there is an arm 20 and a link 21 connecting the arm with the respective brakes 14, so that the rocking of the shaft 16 actuates the brakes 14.

A foot lever 22 is conveniently arranged for the operator and is supported on any suitable part of the frame as by a bracket 23, and a hand lever 24 is pivotally supported on one of the frame side bars 11, as at 25.

The foot lever 22 is connected to normally operate the rock shafts 15 and 16 in substantial unison with balanced action between the shafts so that the brakes at one end of the vehicle may be actuated with slightly less pressure than those at the other end. The connections include a long arm 26 on the rock shaft 15, a shorter arm 27 on the rock shaft 16, a floating lever 28 pivotally connected between its ends to the end of the arm 27, as at 29, a link 30 connecting the end of the arm 26 with one end of the floating lever 28, and a rod 31 connecting the other end of the floating lever 28 with an arm 32 on the lever 22. With this mechanism it will be seen that when the lever 22 is operated the arms 26 and 27 will be drawn toward each other with balanced or constantly related action between them so that the shafts 15 and 16 are rocked and the front and rear brakes actuated. This is the normal operation of all four brakes of the vehicle and this mechanism is, generally speaking, termed the service brake.

For a standing brake, that is a brake to hold the vehicle when parked, the hand lever 24 is connected to one of the rock shafts, preferably the rock shaft 16, through a rod 33 and an arm 34, the latter being connected to the rock shaft 16. The rod 33 has a pin and slot connection 35 with the arm 34 so that the shaft 16 may be rocked by the foot lever without at the same time rocking the hand lever 24. Also, the pivotal connection 29 is in a slot 36 in the floating lever 28 so that the pin 29 may move in said slot 36 when the shaft 16 is rocked by the hand lever and thus cause no corresponding movement of the foot lever. Any usual or suitable means, not shown, for retaining the hand lever in its set position may be used. With the above construction the rear brakes 14 may be actuated by the hand lever 24 regardless of what may happen to the described connections between the foot lever 22 and the rock shafts.

Since there is no equalization between one of the brakes of a pair and the other, it will be seen that failure of one of the rods 19 or 21 would have no effect on the other three brakes. There is, however, the possibility that several of these connections may break at one time or may fail due to a careless workman omitting to properly connect them, and it is for the purpose of further safeguarding the braking mechanism that the present invention provides a second interconnection between the rock shafts 15 and 16 whereby the rocking of shaft 16 by the foot lever 22 will also rock shaft 15 even though the balanced action between the shafts is otherwise interfered with. This interconnection is illustrated in the form of intermeshing segments on the shafts 15 and 16 and, as shown, the segment 37 is in the form of a single gear tooth and the segment 38 represents two gear teeth between which the tooth 37 is arranged. There is some clearance between these teeth, shown somewhat exaggerated in the drawings but sufficient to permit the balanced action between the front and rear pairs of brakes in the normal operation of the service brake. This clearance or back-lash or looseness may be indicated by the spaces 39 on both sides of the tooth 37.

By the above arrangement it will be seen that should the connections from the rock shaft 16 to both of the brakes 14 entirely fail the front brakes of the vehicle could still be actuated by the foot lever 22 because the initial movement of the foot lever 22 would take up the looseness between the segments 37 and 38 and the further movement of the rock shaft 16 would rock the shaft 15 through those segments. This rocking of the shaft 15 would of course actuate the front brakes 13.

This second interconnection between the rock shafts 15 and 16 also causes a partial actuation of the front brakes when the rear brakes are set by the hand lever 24. Thus, when the hand lever 24 rocks the shaft 16 the pin 29 moves in the slot 36 and the segment 38 then takes up the lost motion between itself and the segment 37 and the shaft 15 is then rocked with the continued rocking of the shaft 16. Thus the rear brakes are first actuated and the front brakes are later actuated by the movement of the hand lever 24.

Application of the brake mechanism by the foot lever 22 tends to spring the rock shafts 15 and 16 towards each other. The supporting brackets 17 for these shafts are rather widely separated and this springing of them would be considerable were it not for the means employed herein for resisting it. Referring to Fig. 3, it will be seen that the top of the tooth 37 bears against the bottom of the space between the teeth of the segment 38 and as the shafts are rocked this tooth 37 rocks against the convex surface with which it is in contact and prevents the shafts 15 and 16 from springing or being distorted.

Should it be desirable to apply the principle of this means for preventing the distortion of the shafts at another point in the length of the shafts, the construction shown in Fig. 4 may be employed. In this form the shafts 15 and 16 have abutting arcuate surfaces thereon as shown at 40. These surfaces rock on each other as the shafts are rocked, and consequently the shafts cannot be drawn closer together at that point.

It will be understood that various forms of the invention other than those described above may be used without departing from the spirit or scope of the invention.

Having thus described my invention, what I claim and desire to secure by Letters Patent is:

1. In a motor vehicle, the combination with a front and a rear brake, devices for operating them respectively, a brake operating lever, and means connecting the lever to the devices for operating the brakes with balanced action between them, of normally inoperative means for operating both of said devices from said lever upon impairment of parts to an extent sufficient to destroy the balanced action.

2. In a motor vehicle, the combination with a pair of front brakes and a pair of rear brakes, devices for operating the pairs respectively, an operating lever, and means connecting the lever to the devices for operating said brakes with balanced action between the pairs, of normally inoperative means for operating first one and then the other of said devices from said lever upon impairment of parts sufficient to destroy the balanced action.

3. In a motor vehicle brake mechanism, the combination with two rock shafts for operating separate brakes, a lever, and means for rocking said shafts from said lever with balanced action between them, of a normally inoperative connection between said shafts for causing a rocking action of said shafts by said lever upon impairment of the balanced action between them.

4. In a motor vehicle, the combination with two rock shafts for operating separate brakes, a lever, and means for rocking said shafts from said lever with balanced action between them, of normally inoperative means on said shafts for operating one from the other upon impairment or failure of parts that destroy the balanced action between said shafts.

5. In a motor vehicle, the combination with two rock shafts for operating separate brakes, a lever, and means for rocking said shafts from said lever with balanced action between them, of normally inoperative gearing between said shafts for rocking one shaft by the other shaft upon impairment of the balanced action between them.

6. In a motor vehicle, the combination with two rock shafts for operating separate brakes, a lever, and means for rocking said shafts from said lever, of gearing between said shafts having considerable back lash in both directions so that the gearing is normally inoperative but becomes operative upon failure of some other part of the mechanism.

7. In brake mechanism, the combination of two parallel rock shafts, means for rocking the shafts adapted to spring the shafts towards each other, and co-operating arcuate means secured to and moving with the shafts for retaining the shafts in alinement.

8. In brake mechanism, the combination of rock shafts supported adjacent their ends, means connected to the shafts between their ends for rocking the shafts, said means tending to spring the shafts towards each other, and rolling contact faces on the shafts to prevent misalinement of the shafts.

9. In a motor vehicle, the combination of two brake rock shafts, means for operating said shafts with balanced action between them, loosely meshing gears between said shafts adapted to be inoperative in the normal operation of the mechanism but to come into action upon impairment of the balanced action, and arcuate surfaces on co-operating parts of said gearing adapted to contact to prevent springing of the shafts towards each other.

10. In a vehicle having a brake on each wheel and a connected brake lever and rock shaft, means operated upon oscillation of the rock shaft for applying the brakes of the rear wheels, means for applying the brakes of the front wheels simultaneously with the brakes of the rear wheels, and means actuated by the rock shaft for applying the brakes of the front wheels independently of the brakes of the rear wheels.

11. In a vehicle having a brake on each wheel and a connected brake lever and rock shaft, means operated upon oscillation of the rock shaft for applying the brakes of the rear wheels, means for applying the brakes of the front wheels simultaneously with the brakes of the rear wheels, and connections between the rock shaft and the last mentioned means for independently applying the brakes of the front wheels when the brakes of the rear wheels are inoperative.

12. In a vehicle having a brake on each wheel, a pair of rock shafts mounted upon the vehicle, connections from one of said rock shafts to the brakes of the front wheels and connections from the other rock shaft to the brakes of the rear wheels, a brake lever connected and arranged to oscillate said rock shafts with balanced action between them, and lost motion connecting means between the shafts to independently apply the brakes of the front wheels including loosely intermeshed members respectively secured to the rock shafts.

13. The combination with a four wheel braking mechanism for vehicles including a brake lever and a pair of rock shafts with connections between the brake lever and the rock shafts, of lost motion connecting means between the shafts whereby the brakes of the wheels at one end of the vehicle may be actuated when the brakes of the wheels at the other end of the vehicle are inoperative.

14. The combination with braking mechanism for vehicles including a pair of rock shafts arranged to be oscillated during the application and release of the brakes, of cooperating means carried exclusively by the shafts and moving therewith for maintaining the desired distance between the shafts during the application of the brakes.

15. The combination with a four wheel braking mechanism for vehicles including a pair of rock shafts arranged to be oscillated during the application and release of the brakes, of means for interconnecting said shafts and for preventing distortion of said shafts during their oscillating movements comprising a member fixed on one shaft and having a recess formed with an arcuate wall and a member fixed on the other shaft and carrying a projecting tooth adapted to enter said recess and having an arcuate outer wall arranged to contact the arcuate wall of the recess during the oscillations of the shafts.

16. In a motor vehicle, the combination with front and rear brakes, of a lever and connections for operating said brakes simultaneously, and a second lever and connections for operating said brakes, the initial movement of said second lever operating the brakes at one end of the vehicle and a continued movement thereof picking up and operating the brakes at the other end of the vehicle.

17. In brake mechanism, the combination of two parallel rock shafts, brakes operated by said shafts and connected thereto adjacent the ends of the shafts, means connected to the shafts between their ends for rocking the shafts, said means tending to spring the shafts toward each other, and co-operating means positioned on and moving with the shafts for retaining the shafts in alignment.

18. In brake mechanism, the combination of two parallel rock shafts, means for rocking the shafts adapted to spring the shafts toward each other, and co-operating means positioned on and rotating with the shafts for retaining the shafts in alignment, said latter means being mounted adjacent the connection of the rocking means to the shafts.

19. In brake mechanism, the combination of two parallel rock shafts, means adjacent the ends of the shafts for supporting the shafts, means connected to the shafts between their ends for rocking the shafts, said means tending to spring the shafts toward each other, and cooperating means positioned on and rotating with the shafts for retaining the shafts in alignment, said latter means being independent of the shaft supporting means.

In testimony whereof I affix my signature.

ALFRED MOORHOUSE.